(12) United States Patent
Pineau

(10) Patent No.: US 7,527,710 B2
(45) Date of Patent: May 5, 2009

(54) INCREASED-CAPACITY STILL FOR HIGH-QUALITY DISTILLATION

(75) Inventor: Jean Pineau, Cognac (FR)

(73) Assignee: Societe Jas Hennessy & Co., Cognac (FR)

( * ) Notice: Subject to any disclaimer, the term of this patent is extended or adjusted under 35 U.S.C. 154(b) by 694 days.

(21) Appl. No.: 10/517,990

(22) PCT Filed: Jun. 19, 2003

(86) PCT No.: PCT/FR03/01882

§ 371 (c)(1),
(2), (4) Date: Jun. 9, 2005

(87) PCT Pub. No.: WO04/000991

PCT Pub. Date: Dec. 31, 2003

(65) Prior Publication Data

US 2005/0227341 A1    Oct. 13, 2005

(30) Foreign Application Priority Data

Jun. 20, 2002 (FR) .................................. 02 07657

(51) Int. Cl.
*B01D 3/02*      (2006.01)
*C12G 3/12*      (2006.01)

(52) U.S. Cl. .................... 202/153; 202/266; 202/267.1; 426/493

(58) Field of Classification Search ................. 202/153, 202/266, 267.1; 203/86; 426/492–494; 435/161
See application file for complete search history.

(56) References Cited

U.S. PATENT DOCUMENTS 3,151,042 A * 9/1964 Koshoot ....................... 203/27
4,437,937 A * 3/1984 McGraw ..................... 202/160

FOREIGN PATENT DOCUMENTS

| DE | 31 50 283 | 10/1982 |
| EP | 459 310 | 12/1991 |
| GB | 419436 | 11/1934 |
| JP | 59-166077 | 9/1984 |

\* cited by examiner

*Primary Examiner*—Virginia Manoharan
(74) *Attorney, Agent, or Firm*—Leydig, Voit & Mayer, Ltd.

(57) ABSTRACT

A still for distilling an alcoholic liquid such as wine. The still includes a chamber with a copper wall, which is intended to receive an alcoholic liquid, the capacity of the chamber representing a certain volume. The liquid which occupies the volume at the start of the distillation and the chamber wall define, by mutual contact, a first interface with an area to volume ratio that is at most equal to 27 square centimeters per liter. The still also includes one or more copper plates which are disposed inside the chamber and which are submerged in the alcoholic liquid. When the volume is occupied by a liquid, the liquid together with the copper plates define a second interface with an area and the ratio of the total area of the interfaces to the volume is at least equal to 30 square centimeters per liter.

11 Claims, 2 Drawing Sheets

INCREASED-CAPACITY STILL FOR HIGH-QUALITY DISTILLATION

FIELD OF THE INVENTION

This invention is in the general field of distillation, notably that of wine distillation and, in particular, for the production of cognac.

More specifically, the invention concerns a still for distillation of a potable alcoholic liquid, this still comprising a copper-walled chamber designed to hold an alcoholic liquid, the filling capacity of the chamber representing a certain volume, and the liquid occupying this volume at the beginning of distillation and the wall defining, by mutual contact, a first interface presenting an area of which the area-to-volume ratio is equal to a maximum of 27 square centimeters per liter.

BACKGROUND

In the preferred application of the invention, that is, for production of cognac, the distillation takes place in two stages.

The first distillation, called "first heating" or "heating of the wine" obtains from the wine a first distillate called the "broullis."

To date, this first heating has been advantageously conducted in stills with a relatively small capacity, traditionally 25 hectoliters.

In fact, the person skilled in the art knows from experience that spirits from a first distillation in larger stills, such as 50 or even 100 hectoliters, lack "finesse."

More specifically, to the experienced taster, these spirits are characterized by a certain heaviness and are clearly distinguished by their organoleptic properties from the spirits obtained by distillation in 25-hectoliter stills, which are lighter. The term "heaviness" is used to describe the gustatory and/or olfactory impressions reminiscent of fatty substances.

Under these conditions, the person skilled in the art naturally sees distillation in a 25-hectoliter still as the standard for quality of a spirit.

The problem is that the quantitative requirements in the production of spirits, particularly cognac, justify the use of large 50- to 100-hectoliter stills for the first distillation. For the same production volume, the cost to make and install these stills is much lower than that of 25-hectoliter stills.

SUMMARY OF THE INVENTION

In this context, the purpose of the present invention is to offer a still with a capacity greater than 25 hectoliters that can produce a high-quality spirit essentially identical in its organoleptic properties to a spirit obtained by distillation in a 25-hectoliter still.

To this end, the still of the invention comprises at least one additional copper element for surface contact arranged in the chamber, at least partially immersed in the alcoholic liquid, and defining with it, when it occupies the volume defined by the filling capacity of the chamber, a second interface with a non-zero area, and the ratio of the total area of the first and second interfaces to the volume occupied by the alcoholic liquid at the start of distillation is equal at least to 30 square centimeters per liter.

In practice, the ratio of the total area of the first and second interfaces to the volume is advantageously a maximum of 45 square centimeters per liter, or, preferable, a maximum of 40 square centimeters per liter.

In its preferred mode of embodiment, the still of the invention comprises a number of additional copper elements for surface contact made up of respective copper plates arranged vertically in the chamber.

These copper plates are, for example, arranged radially around a vertical axis of symmetry of the chamber, and are attached to each other by supporting components that form a rigid structure with the plates.

The supporting components advantageously include a copper mounting by which the rigid structure rests on the bottom of the chamber.

These supporting components may also include two copper rings spaced apart from each other and parallel to each other, centered on the axis of symmetry of the chamber and attached to each of the plates.

The still of the invention is particularly applicable to the distillation of wine or a wine distillate, as a potable alcoholic liquid, and more specifically to the process in which wine is distilled to make cognac.

The invention is also applicable to production of all grain (cereal)-based alcohols, particularly whisky and bourbon.

In all of the applications of this still, it is advisable that each additional copper element for surface contact remain totally submerged in the alcoholic liquid for the entire distillation process.

BRIEF DESCRIPTION OF DRAWING FIGURES

Other characteristics and advantages of the invention will become clear from the description to follow, which is given only as an indication and is not limiting in any way, with reference to the attached illustrations in which.

As indicated above, the invention concerns a still for distillation of a potable alcoholic liquid L, for example, wine, and particularly, one usable for producing cognac.

Figure 1:
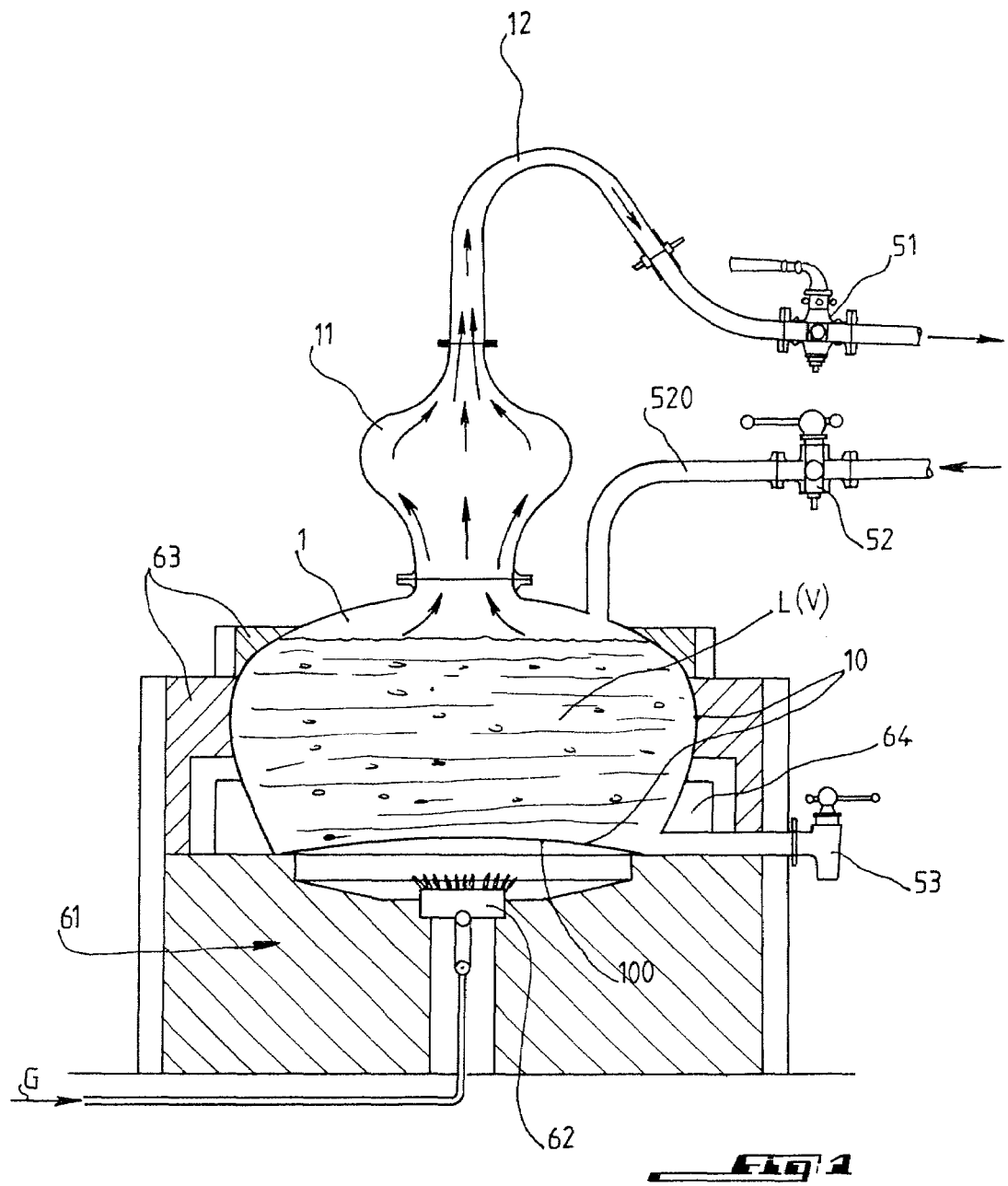
FIG. 1 is a vertical section of a known still.

A still of this kind traditionally includes (FIG. 1) a chamber 1 that forms the bottom part, which is called the "cucurbite," a head 11 sealed on top of the chamber 1, and a swan neck 12 extending the head 11 and leading to a condensation coil (not shown).

The wall 10 of the chamber 1, including its bottom 100, as well as the head 11, the swan neck 12, and the coil are made of copper.

A bypass valve 51 is generally interposed between the swan neck and the coil (not shown).

A filling line 520 opens into the top of the chamber 1; on this filling line there is a filling valve 52 for communication between a wine heater (not shown) and the chamber 1 to fill the chamber with wine previously heated at the beginning of each distillation cycle.

The bottom of the chamber 1 is connected to a drainage valve or "cartridge" 53 to evacuate the residuary liquor, the bottom 100 of the chamber 1 being concave so that it can be drained completely.

The chamber 1 is set on a pedestal 61 above a burner 62, for example, a burner supplied with combustible gas G.

A heat-resistant mantle 63 constructed on the pedestal 61 delimits a firebox 64 surrounding the chamber 1 and connected to a chimney (not shown).

The chamber 1 has a filling capacity representing a certain volume V which, at least at the beginning of a distillation cycle, is occupied by wine or by another alcoholic liquid L.

At this stage of filling of the chamber 1, the wine or alcoholic liquid L contained in the chamber and the wall 10 of this chamber define, by mutual contact, an interface presenting an area that will be noted symbolically as S1.

At the beginning of the distillation cycle, for stills with a relatively large capacity such as a minimum of 50 hectoliters to which the invention applies, the S1/V ratio of the area S1 to the volume V of wine or other alcoholic liquid L contained in the chamber is a maximum of 27 square centimeters per liter.

To permit a still of this kind to produce the best quality spirits, the invention particularly provides increased contact surface between the wine or other liquid to be distilled and the copper.

Thus, a still with a relatively large capacity and according to the invention includes (FIGS. 2 and 3) one or more additional copper surface contact elements, in the form of plates 2, for example, arranged in the chamber 1, at least partially submerged in the wine or other alcoholic liquid L, and defining with it a supplementary interface presenting a non-zero area which will be noted symbolically as S2.

The effect of such an arrangement is best when the ratio (S1+S2)/V of the total area (S1+S2) of the interfaces formed by mutual contact of the wall 10 and the wine or other alcoholic liquid L contained in the chamber 1, with volume V of this wine or other alcoholic liquid L, is equal at least to 30 square centimeters per liter, but preferably a maximum of 45 square centimeters per liter.

Figure 2:
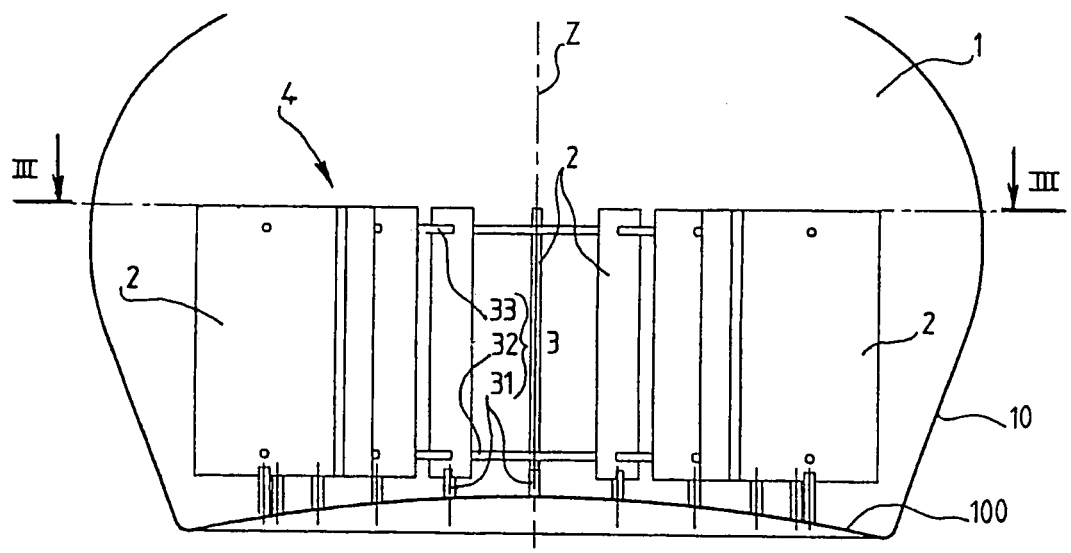
FIG. 2 is a partial vertical section of a still according to the invention.
Figure 3:
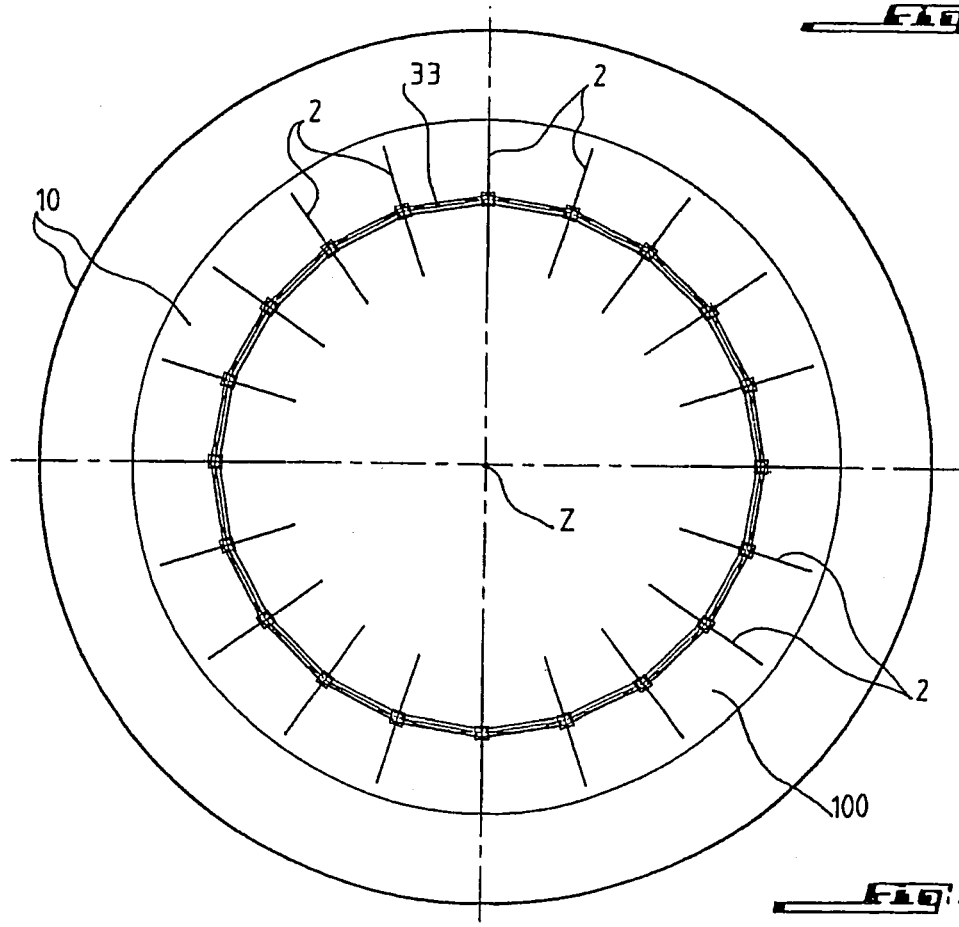
FIG. 3 is a horizontal cross-section of the still illustrated in FIG. 2 and viewed from the angle defined by the arrows III-III of FIG 2.

As shown in FIGS. 2 and 3, the additional copper surface contact elements are formed, for example, by rectangular copper plates 2 arranged vertically in the chamber 1.

These plates 2 can be arranged radially around the vertical axis of symmetry Z of the chamber 1 and can be attached to each other by supporting components 3, which form a rigid structure 4 with these plates 2.

In particular, these supporting components 3 advantageously include a copper mounting 31, by means of which the rigid structure 4 rests on the bottom 100 of the chamber 1, and which favors heat flow from the bottom 100 of the chamber 1 to the plates 2.

These supporting components 3 may also include two copper rings 32 and 33 separated from each other and parallel to each other, centered on the axis of symmetry Z of the chamber 1 and attached to each of the plates 2 by any appropriate means.

As an example, these rings can be threaded through openings in the plates 2 and attached to these plates by cold shaping of the copper in the rings and/or the plates.

In the embodiment of the invention, it is recommended that each copper plate 2 be completely immersed in the wine or other alcoholic liquid L at least at the start of the distillation cycle, and preferred that it remain so for the entire distillation operation.

The invention claimed is:

1. A still for distilling a potable alcoholic liquid, the still comprising:
   a chamber with a copper wall for holding a liquid, the chamber having a volume V and the copper wall defining, by mutual contact with the liquid filling the volume V, a first interface of the wall and the liquid, having an area S1, wherein S1/V is a maximum of 27 square centimeters per liter; and
   at least one additional copper surface contact element positioned in the chamber for at least partial immersion in the liquid in the chamber, and defining a second interface with the liquid filling the volume V and having an area S2, wherein ((S1+S2)/V) is at least 30 square centimeters per liter.

2. The still according to claim 1 wherein ((S1+S2)/V) does not exceed 45 square centimeters per liter.

3. The still according to claim 2, comprising a plurality of the additional copper surface contact elements including respective copper plates in the chamber.

4. The still according to claim 3, wherein the copper plates are arranged radially with respect to an axis of symmetry of the chamber, and including supporting components to which the copper plates are attached in a rigid structure.

5. The still according to claim 4, wherein the supporting components include a copper mounting supported by a bottom of the chamber.

6. The still according to claim 4, wherein the supporting components include two copper rings separated from each other, parallel to one another, centered on the axis of symmetry of the chamber and attached to each of the copper plates.

7. The still according to claim 1, comprising a plurality of the additional copper surface contact elements including respective copper plates arranged vertically in the chamber.

8. The still according to claim 7, wherein the copper plates are arranged radially with respect to an axis of symmetry of the chamber, and including supporting components to which the copper plates are attached in a rigid structure.

9. The still according to claim 8, wherein the supporting components include a copper mounting supported by a bottom of the chamber.

10. The still according to claim 8, wherein the supporting components include two copper rings separated from each other, parallel to one another, centered on the axis of symmetry of the chamber and attached to each of the copper plates.

11. The still according to claim 8, wherein the supporting components include two copper rings separated from each other, parallel to one another, centered on the axis of symmetry of the chamber and attached to each of the copper plates.

* * * * *